Figure 1:
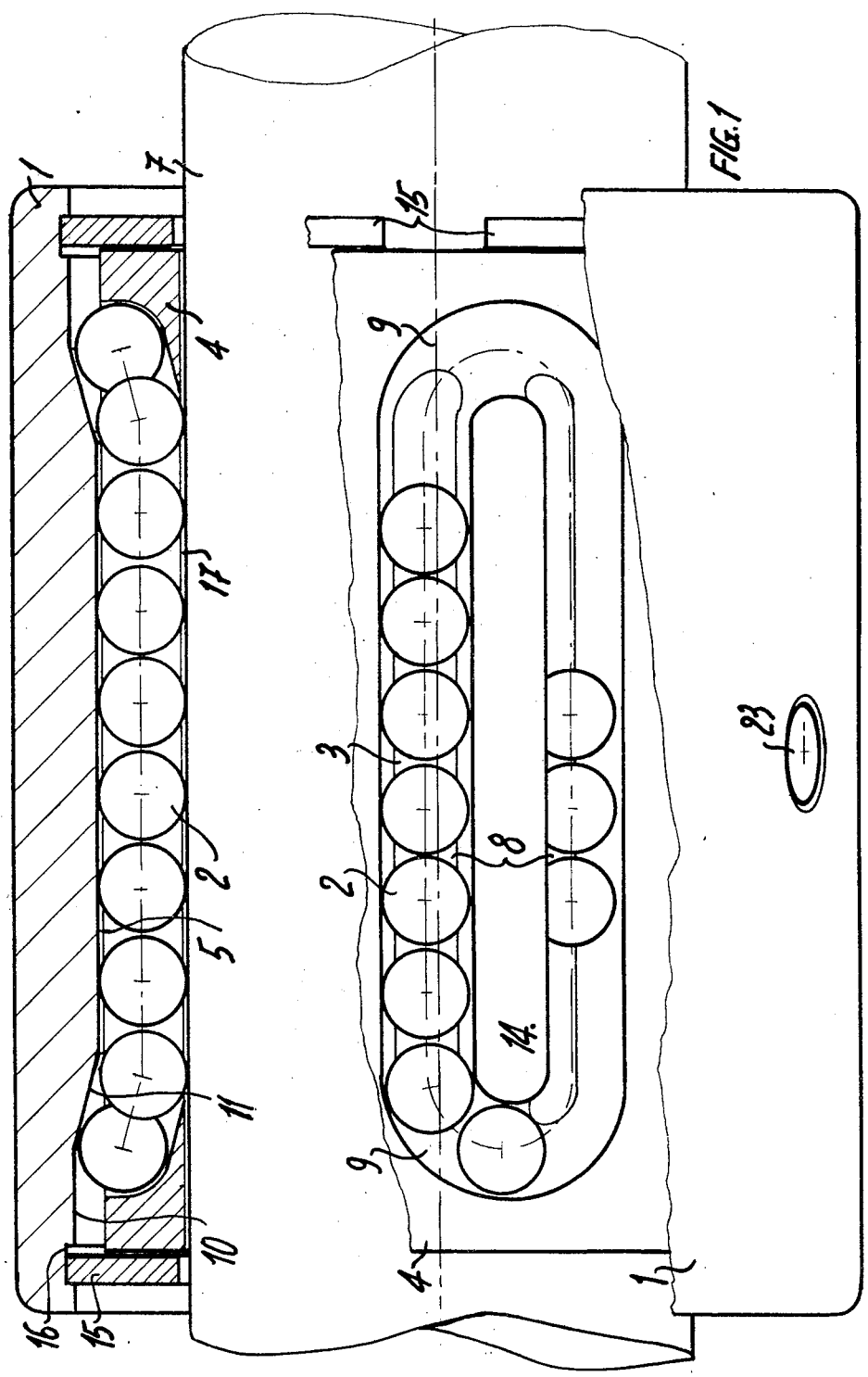

United States Patent [19]

Borel

[11] 4,327,949

[45] May 4, 1982

[54] AXIAL-ROTARY BALL-BEARING GUIDE ELEMENT

[75] Inventor: Denis Borel, Matzingen, Switzerland

[73] Assignee: SRO Kugellagerwerke J. Schmid-Roost AG, Switzerland

[21] Appl. No.: 124,460

[22] Filed: Feb. 25, 1980

[30] Foreign Application Priority Data

Feb. 26, 1979 [CH] Switzerland ............... 1853/79

[51] Int. Cl.³ .................................. F16C 31/06
[52] U.S. Cl. ....................................... 308/6 C
[58] Field of Search ..................... 308/6 C, 185

[56] References Cited

U.S. PATENT DOCUMENTS 3,582,160  6/1971  Schutz ........................ 308/6 C

FOREIGN PATENT DOCUMENTS 13259    7/1980  European Pat. Off. ......... 308/6 C
15243    9/1980  European Pat. Off. ......... 308/6 C
2558195  7/1976  Fed. Rep. of Germany ...... 308/6 C
2558196  7/1976  Fed. Rep. of Germany ...... 308/6 C
1235152  5/1960  France ....................... 308/6 C Primary Examiner—Richard R. Stearns
Attorney, Agent, or Firm—Ostrolenk, Faber, Gerb & Soffen

[57] ABSTRACT

The invention relates to a guide element for unrestricted linear movement and/or rotary movement, involving ball-bearing contact on a shaft. The guide element comprises an external sleeve (1), ball-bearings (2) being arranged in circulation circuits (3) made in a tubular housing (4), the sleeve (1) having in its bore working sections (5) ensuring alternating contact between the ball-bearings (2) and shaft (7), and shallow disengagement sections (6) permitting recycling of the ball-bearings. The housing (4) is provided with at least six closed ball-bearing circulation circuits (3) arranged uniformly in equidistant pairs (13), the number of these pairs (13) of closed circuits (3) being half the number of the sections (5), and the two adjacent rectilinear sections of the two circuits of a pair (13) form an angle at the center smaller than and at most equal to the angle at the center of a section (5).

15 Claims, 18 Drawing Figures

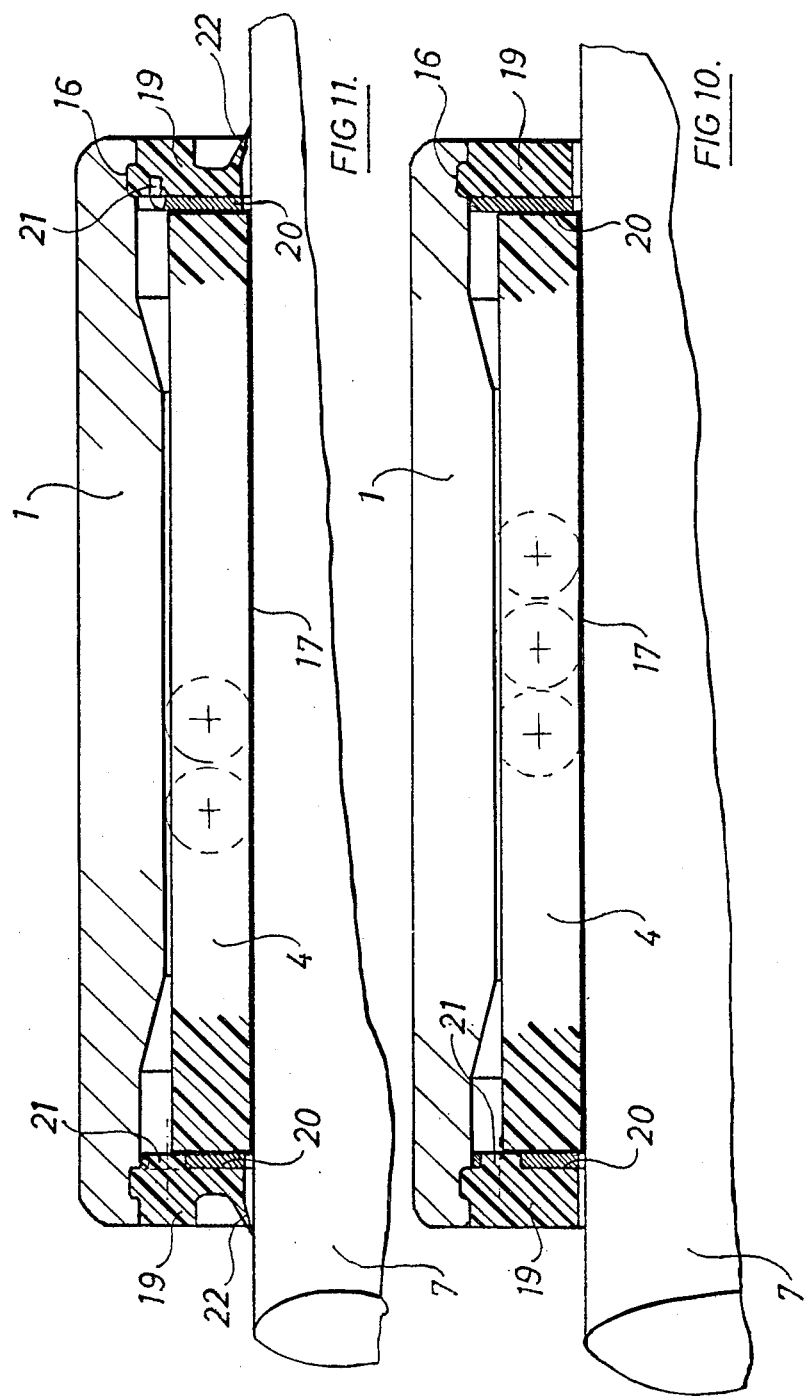

AXIAL-ROTARY BALL-BEARING GUIDE ELEMENT

The object of the present invention is a precision guide element for unrestricted linear displacement accompanied or not by a rotation on a shaft.

Various axial-rotary guide systems involving ball-bearing contact on a shaft are known.
(1) The two-bearing system, which consists of a combination of a needle bearing mounted on the exterior of an axial ball-bearing race. This system occupies a lot of space and lacks precision.
(2) The so-called free cage system, where ball-bearings are placed in a movable cage between the shaft and a cylindrical sleeve. This system does not permit any substantial degree of linear displacement.
(3) Finally, the system involving alternating contact between rectilinear sections of ball-bearing circulation circuits situated in a cage freely able to rotate on working sectors in the external sleeve. The guide element according to the invention relates to this type of system and provides a substantial improvement therein.

The known rotary and unrestricted linear guide element involving alternating contact provides a precise degree of guidance. Nevertheless, its main faults are an insufficient load capacity and too large a number of ball-bearing circuits, resulting in a relatively high cost price. These faults are directly connected with the bearing system itself, and in fact in the known systems the mutual angular disposition of the rectilinear sections of the ball-bearing circulation circuits and respectively of the working sectors and disengagement sectors obey a geometrical law permitting a rotation in a first solution by virtue of a different number of circuits with respect to the sectors, and in a second solution by virtue of the different angles of the circuits arranged in the cage in an irregular manner. These two systems have a single common fault, namely when there is an alternation between ball-bearing circuits on the working sectors, the two rectilinear sections of ball-bearings in this circuit are momentarily unusable, and the closest rectilinear sections serving as working bearings form a large angle $\lambda$ at the centre, thus causing too large a reduction in the load capacity of the guide element. This is a serious fault since this low load capacity, being only momentary, thus gives rise to a large variation in the "lift" of the element, thereby producing vibrations and changing the radial guide position on account of a general angular imbalance of the working bearings of the ball-bearing rectilinear sections in the sleeve. Moreover, the solution employing different angles suffers from the same defects and in addition has the disadvantage that internal space is lost, and accordingly it cannot be manufactured having small dimensions.

The object of the present invention is to obviate these disadvantages, and accordingly the invention proposes a guide element for rotary and unrestricted axial movement involving alternating contact, and that can replace the existing systems while eliminating the aforementioned defects, thus enabling the following advantages to be obtained:
a high load capacity
a general degree of symmetry in the working stresses
implementation in terms of small dimensions
a high degree of guiding precision
an economic cost price.

The guide element according to the invention comprises an external sleeve which axially aligns an internal tubular housing that can rotate freely and comprises closed ball-bearing circulation circuits formed by two longitudinal rectilinear sections intersecting beyond its wall and connected to one another by curved sections at their end, the said sleeve having in its bore working sections that ensure between the ball-bearings and the shaft and disengagement sections permitting an alternating recycling of these ball-bearings, the angular value of the working sections being smaller than the angle at the centre defined by two rectilinear sections of the same ball-bearing circuit and the angular value of a disengagement section being larger than the angle at the centre defined by the two rectilinear sections of the circuit, wherein the said guide element is characterised in that the ball-bearing race is provided with at least six closed ball-bearing circulation circuits arranged in groups of two, these pairs of closed circuits being distributed in a regular angular manner, the number P of pairs being half the number H of working or disengagement sections, themselves also distributed in a uniform manner in the bore of the sleeve, the angle $\alpha$ at the centre defined by the two rectilinear sections of the same circuit being substantially equal to $(360°/4P)$, and the angle $\beta$ at the centre defined by the two adjacent rectilinear sections next to one another in each individual circuit of a pair being smaller than and at most equal to the value of the angle $\gamma$ at the centre defined by a working section of the sleeve.

The guide element according to the invention comprises a new internal geometrical arrangement of the sections and ball-bearing circuits which enables the angle $\lambda$ to be reduced considerably during an alternation. With the same number of circuits as in the existing systems, the guide element according to the invention has an angle $\lambda$ such that the gain obtained confers on the element about twice the load capacity compared with the known and commercially available systems, and in addition the guide element is always symmetrically equilibrated with regard to the load stresses and thus preserves a concentric guide position.

Conversely, with a load capacity identical to that of existing systems, the guide element according to the invention comprises two to three ball-bearing circulation circuits less compared with a guide element of the prior art, thus affording an economy in the cost of the ball-bearings and machining of the ball-bearing housing. In addition, since in this case the number of ball-bearing circuits is less, the ball-bearings may be substantially larger, thereby reducing their number while improving the load capacity, and the ball-race thus gains in mass and rigidity, enabling the latter to be manufactured from a self-lubricating moulded plastics material such as graphite-treated polyamide, which means that the guide element will function smoothly and silently and the cost price of the ball-race will be about 80% cheaper than a machined metal ball-race.

The drawings show, by way of example, various embodiments of an axial-rotary guide element according to the invention, as well as examples comparing the guide element with the current state of the art.

Figure 2:
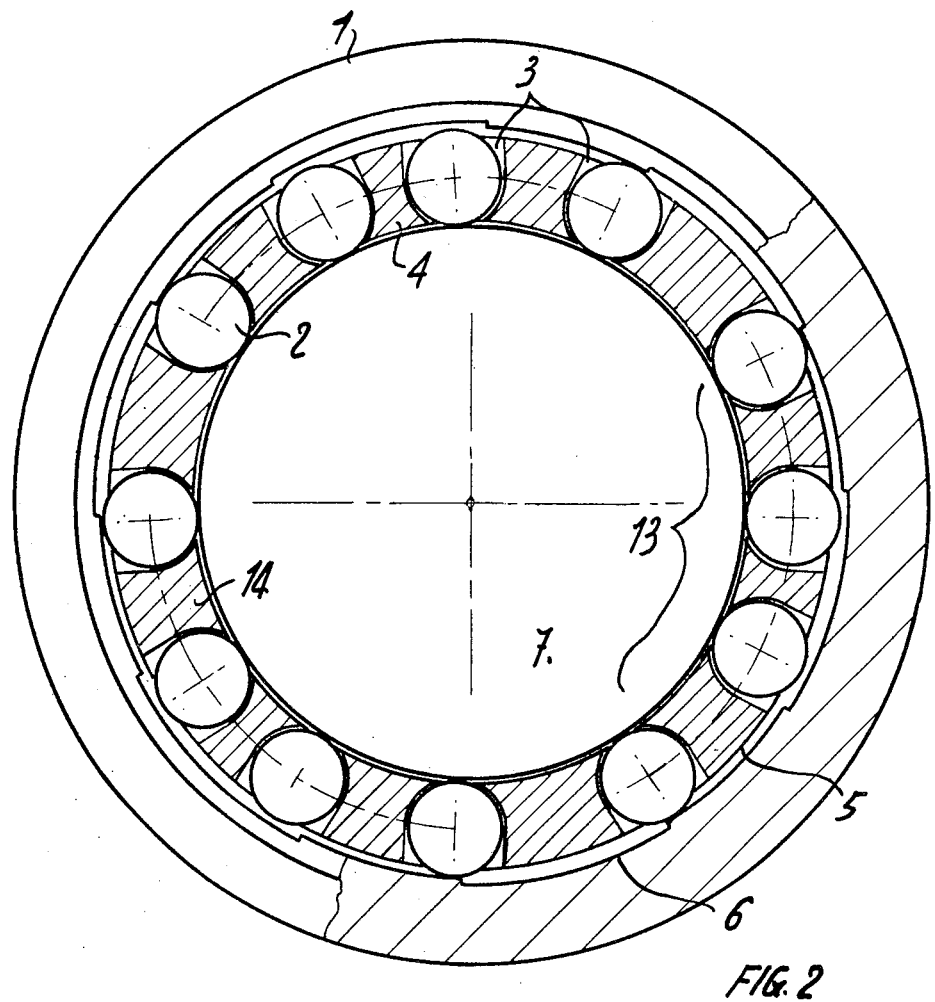
Figure 3:
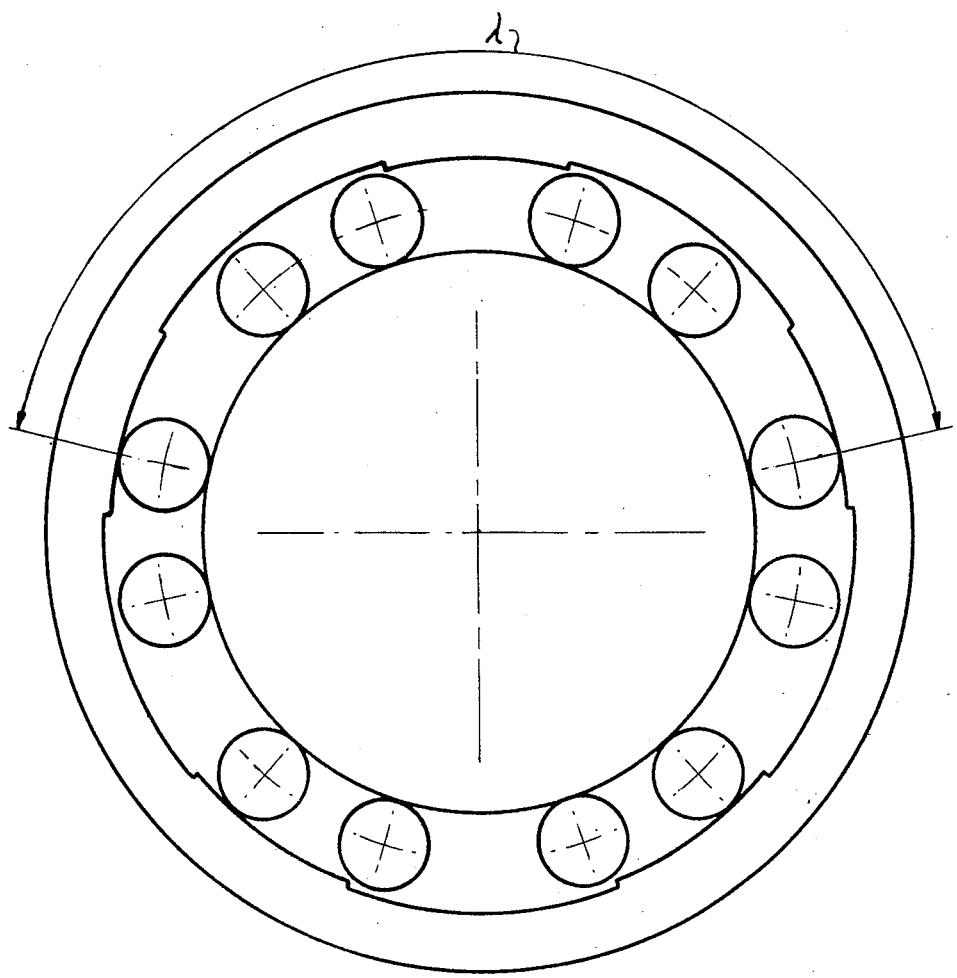
Figure 4:
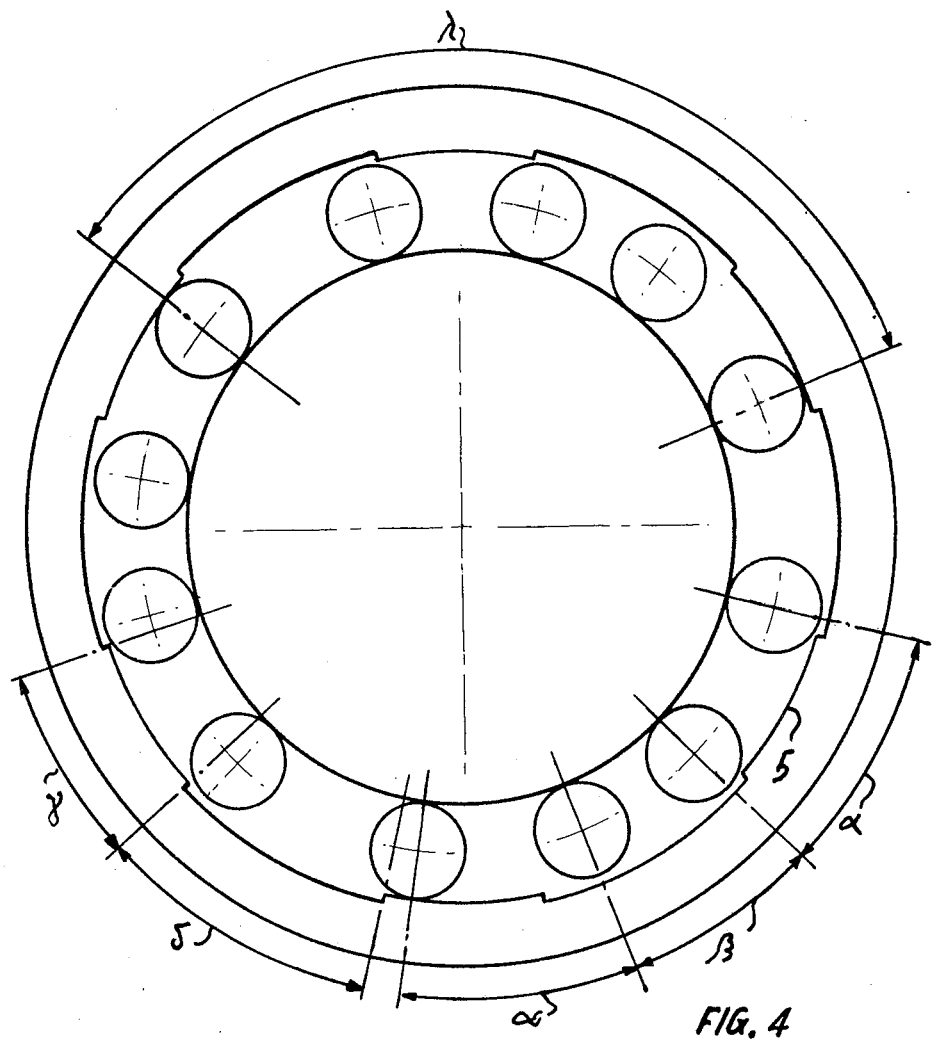
Figure 5:
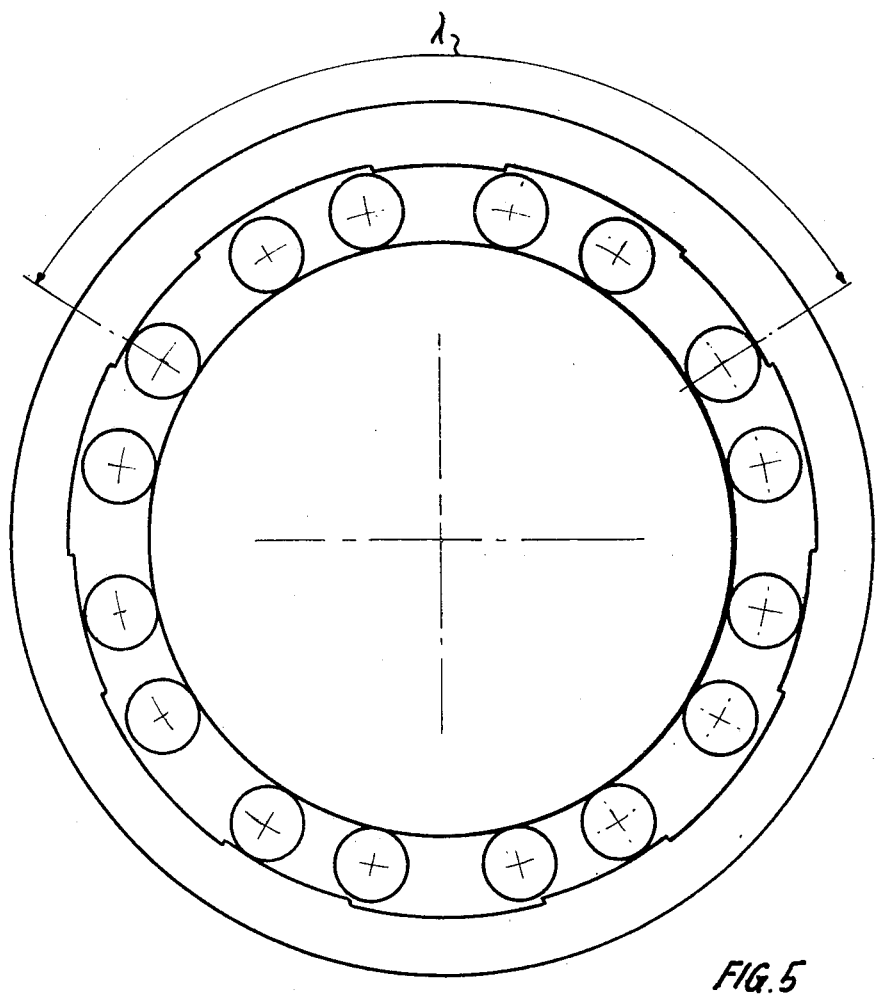
Figure 6:
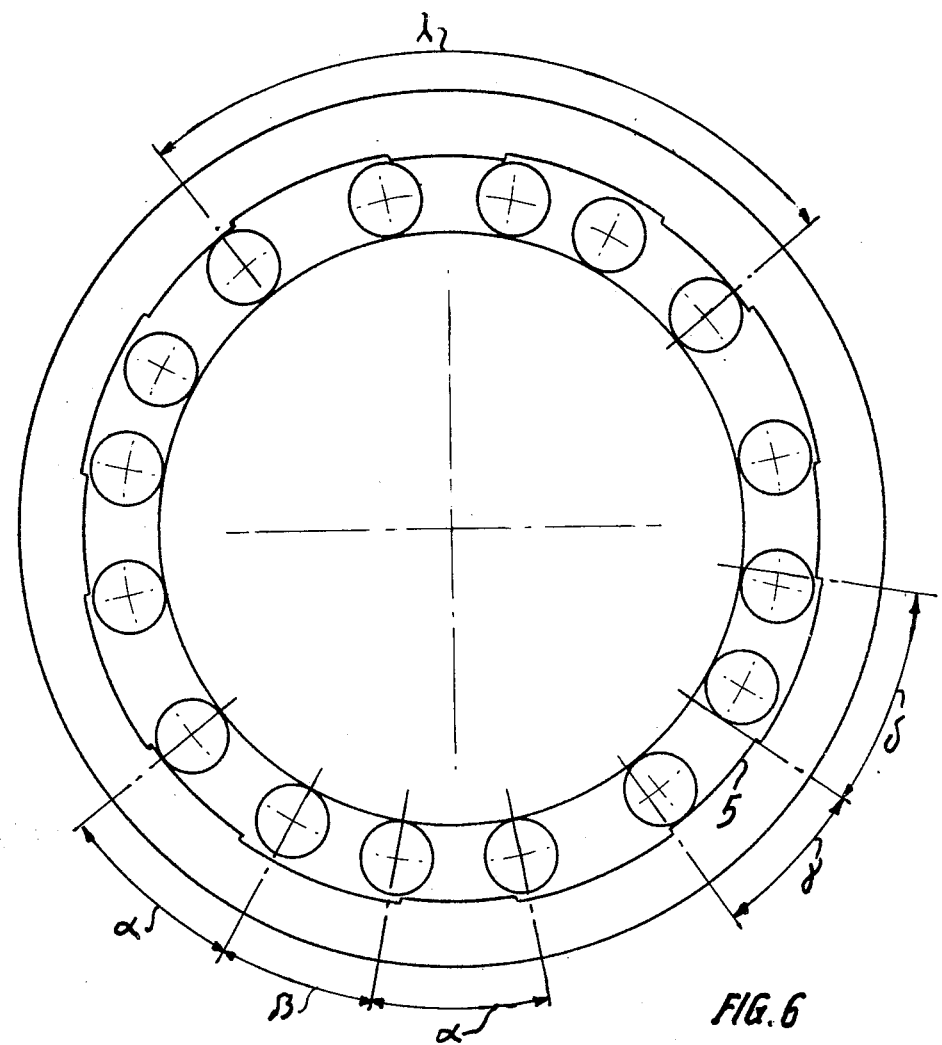
Figure 7:
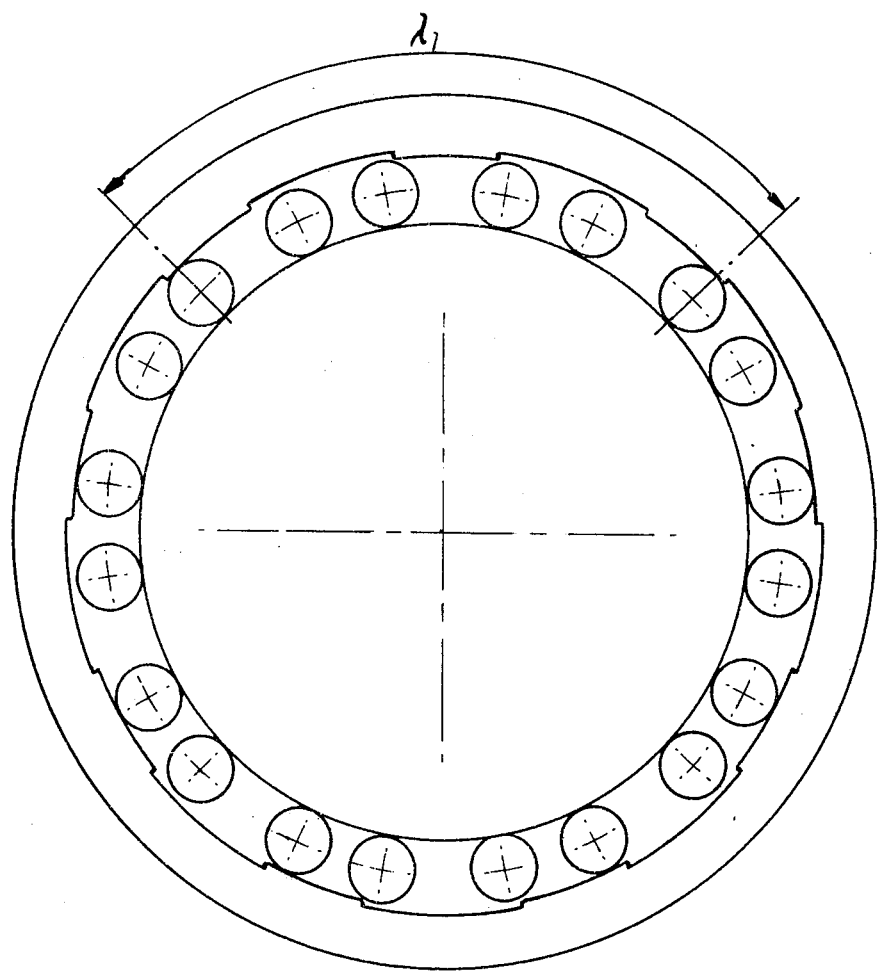
Figure 8:
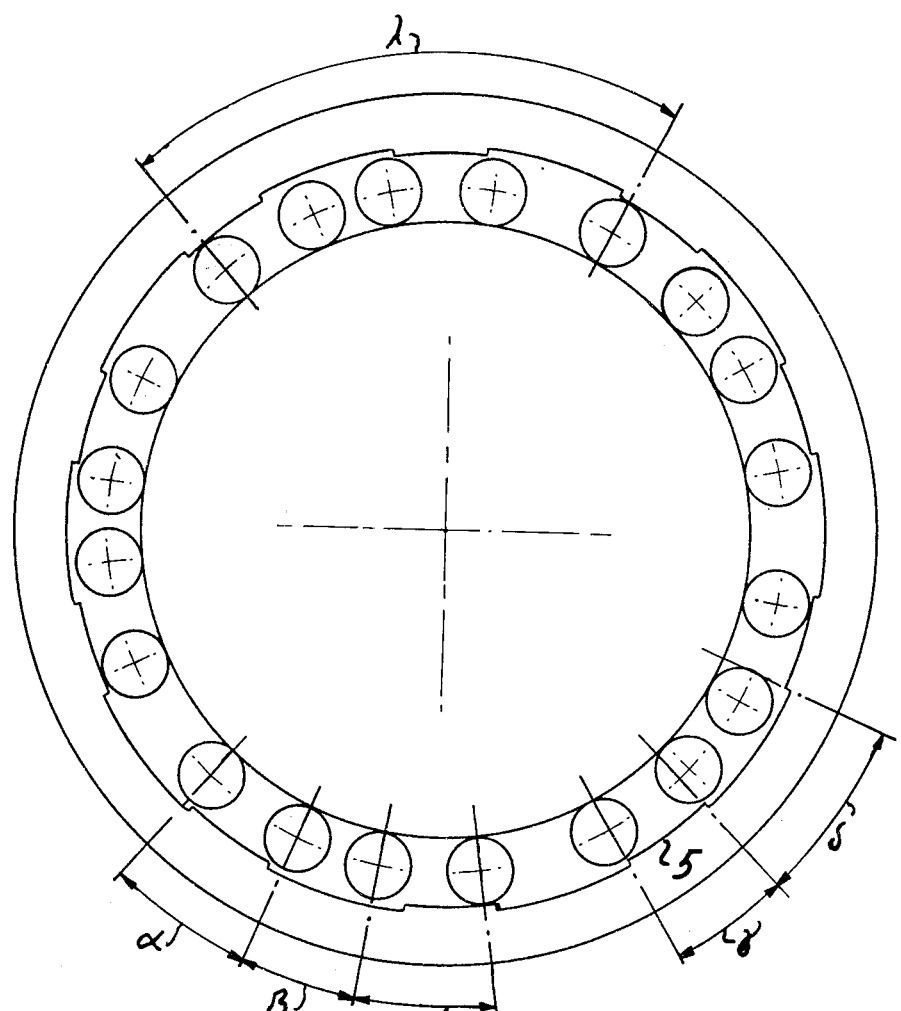
Figure 9:
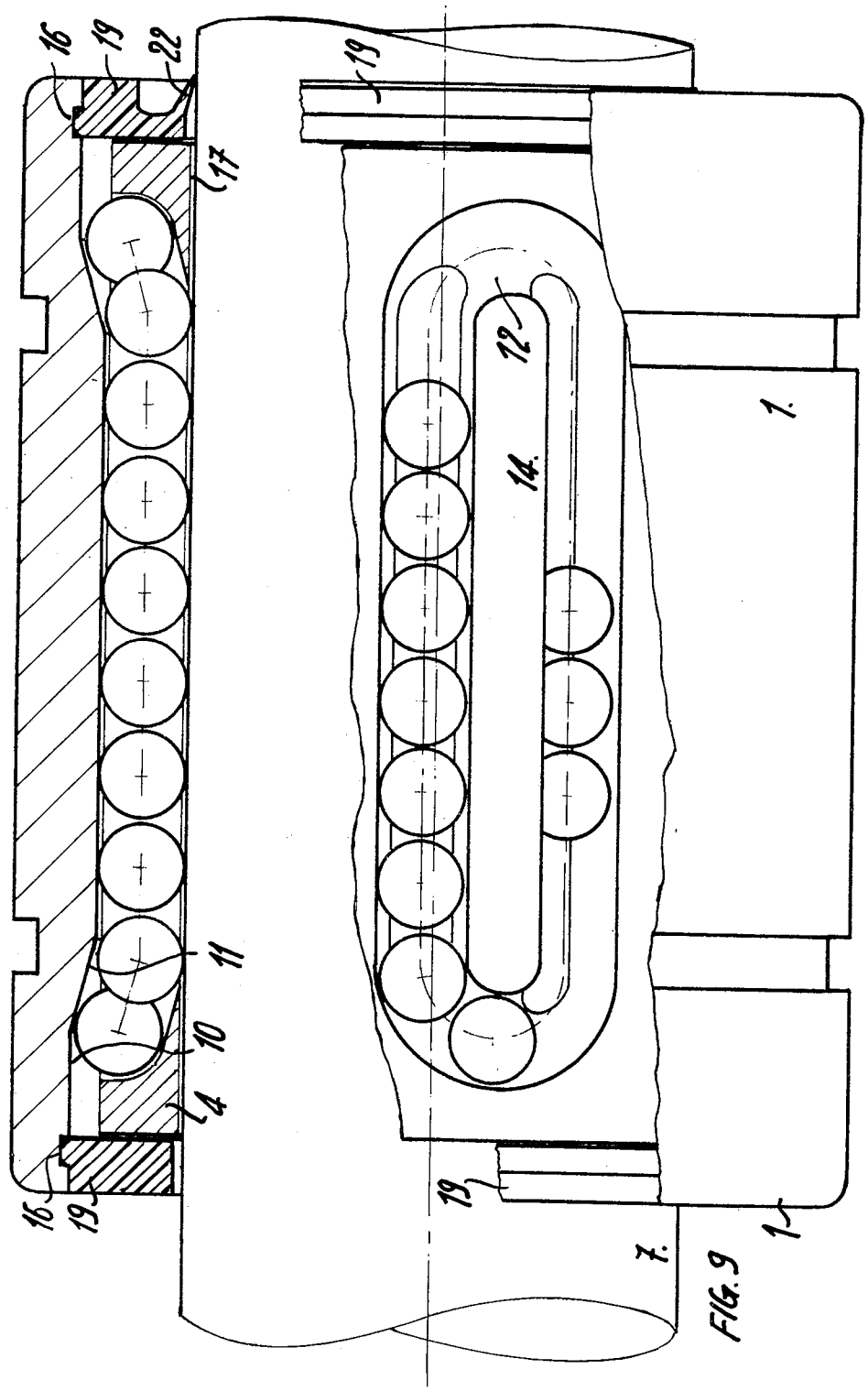
Figure 12:
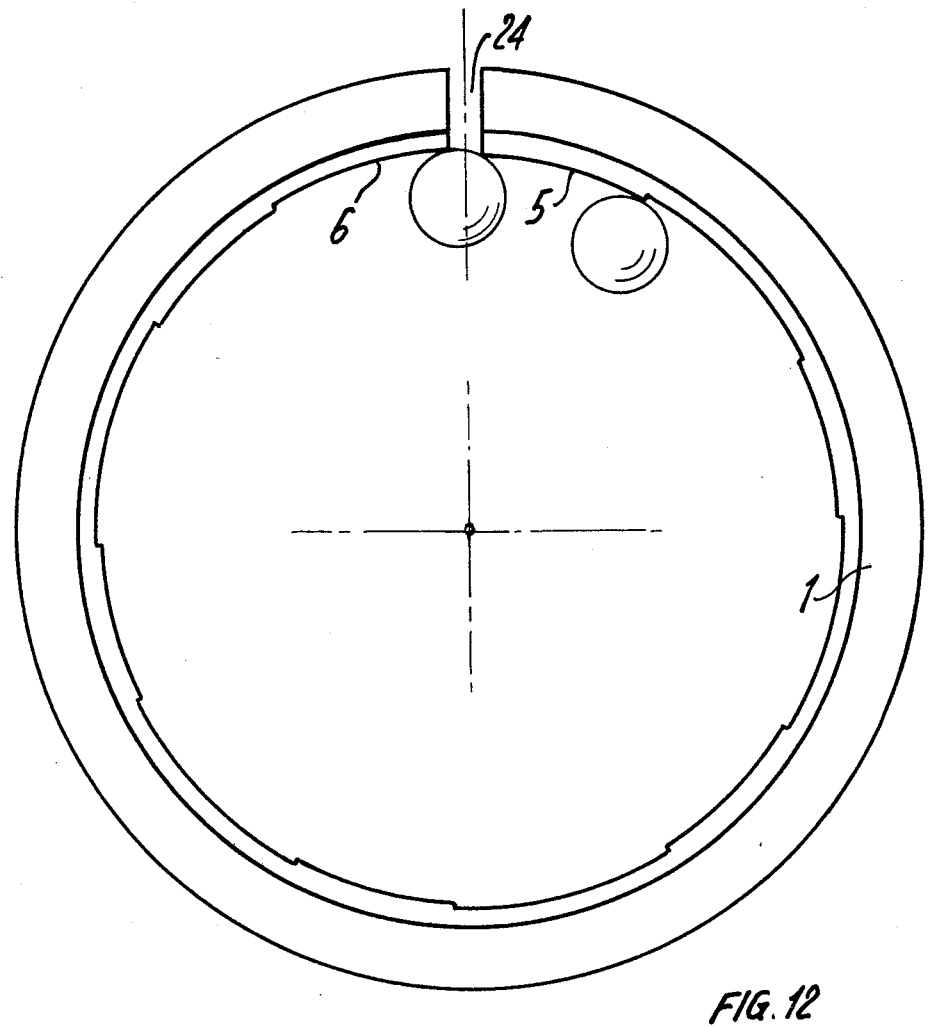
Figure 13:
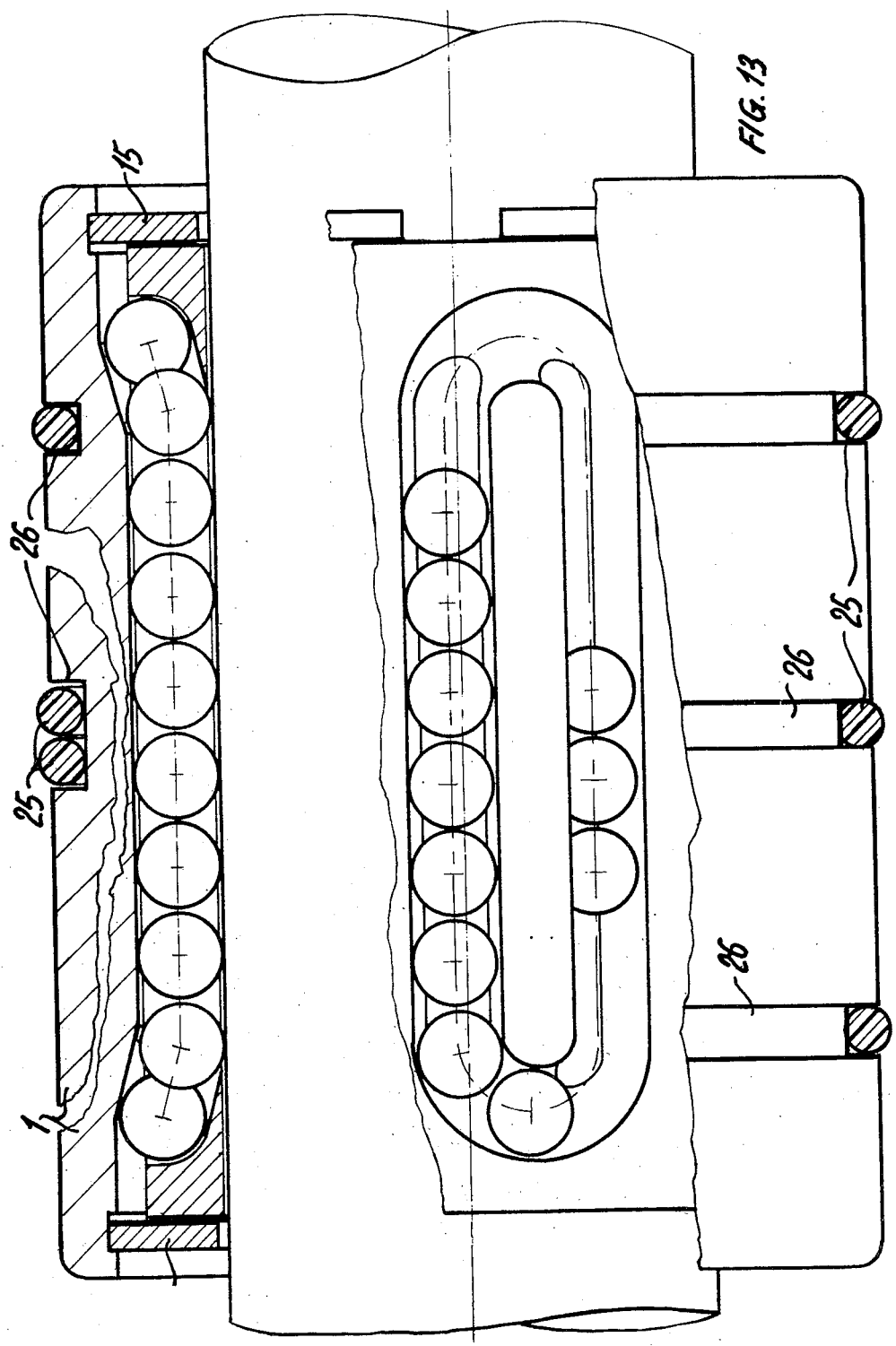
Figure 14:
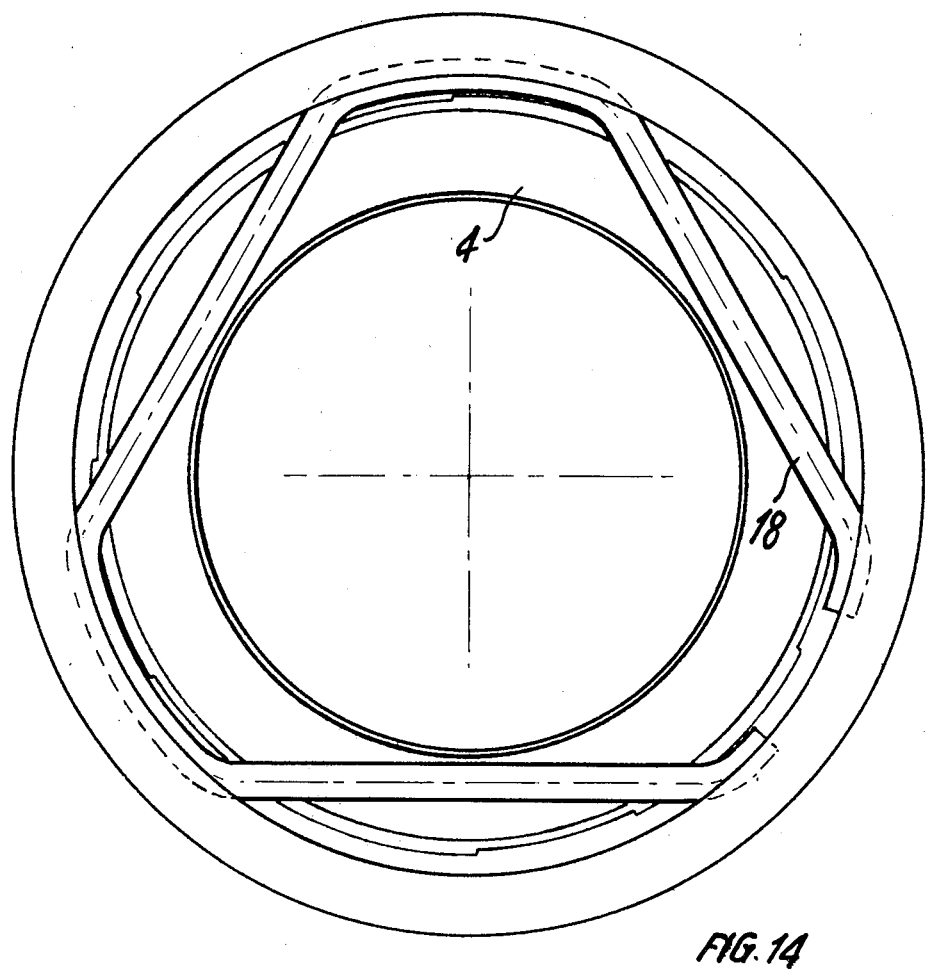
Figure 15:
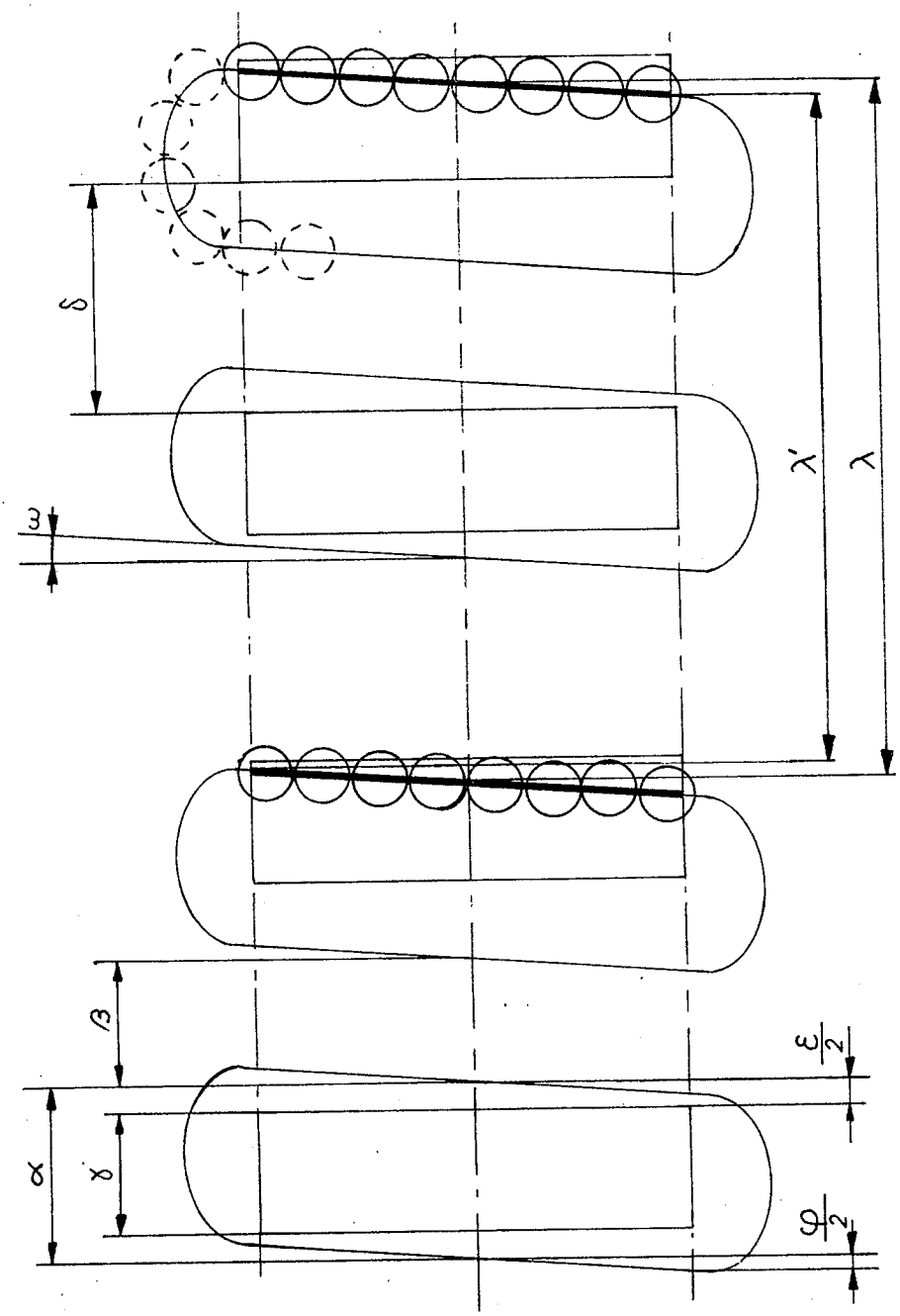
Figure 16:
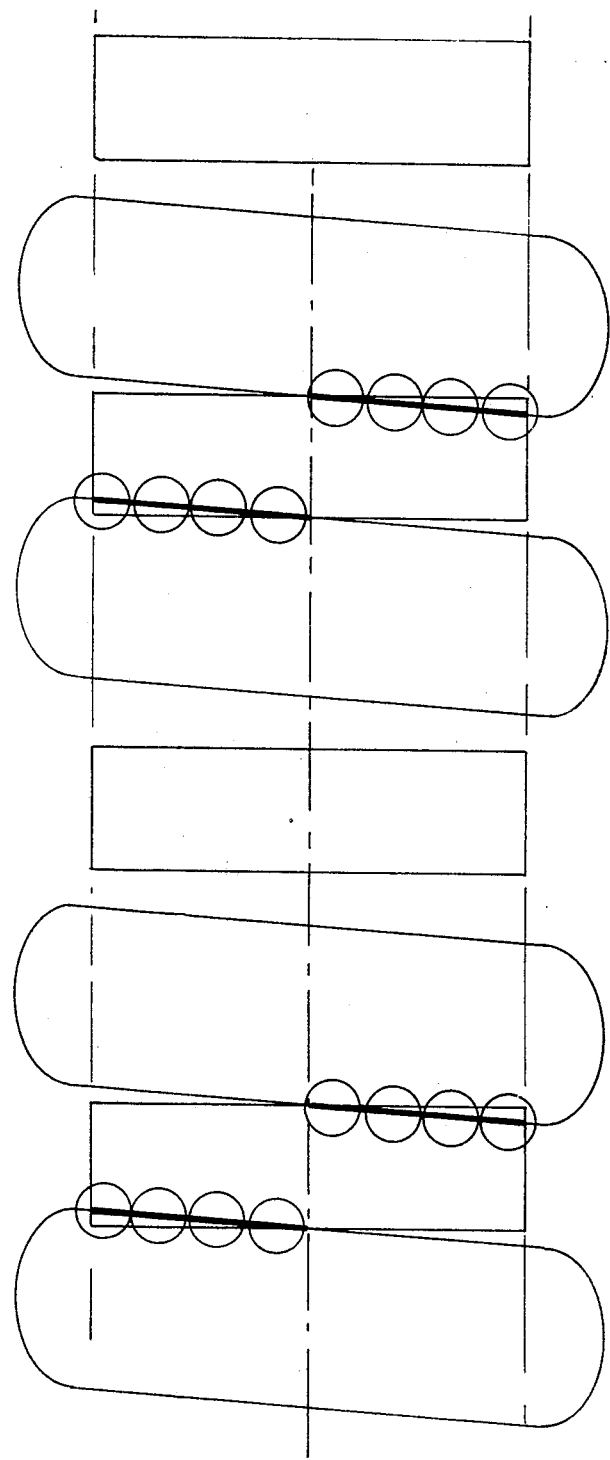
Figure 17:
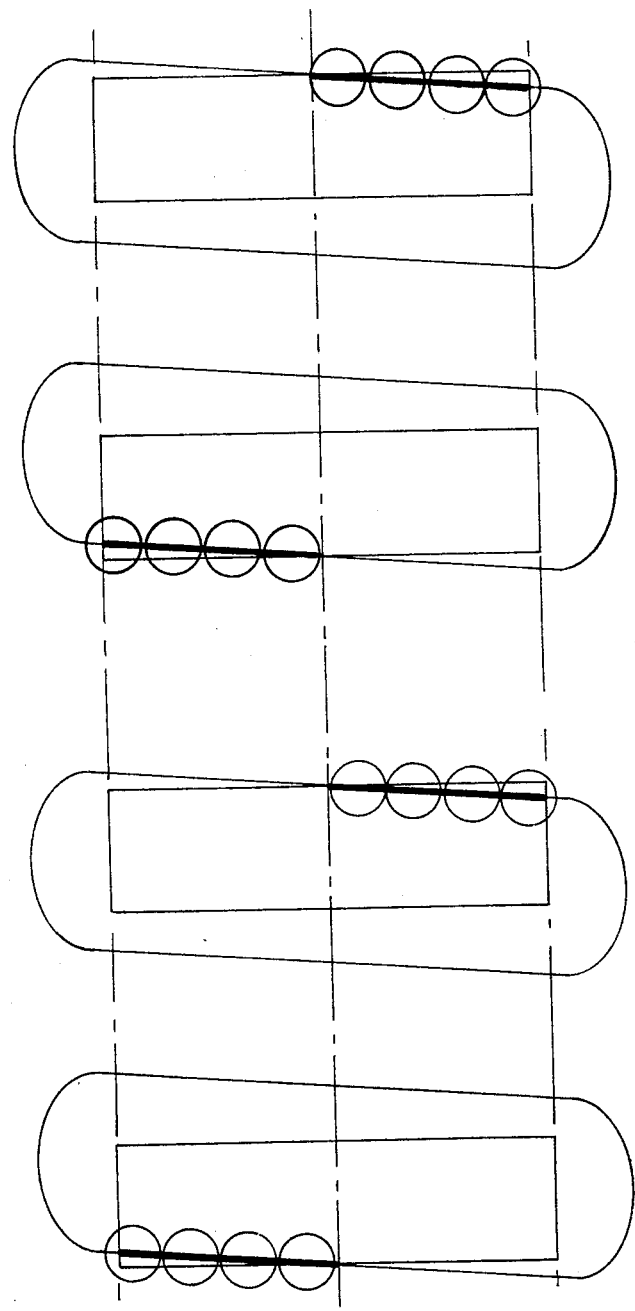
Figure 18:
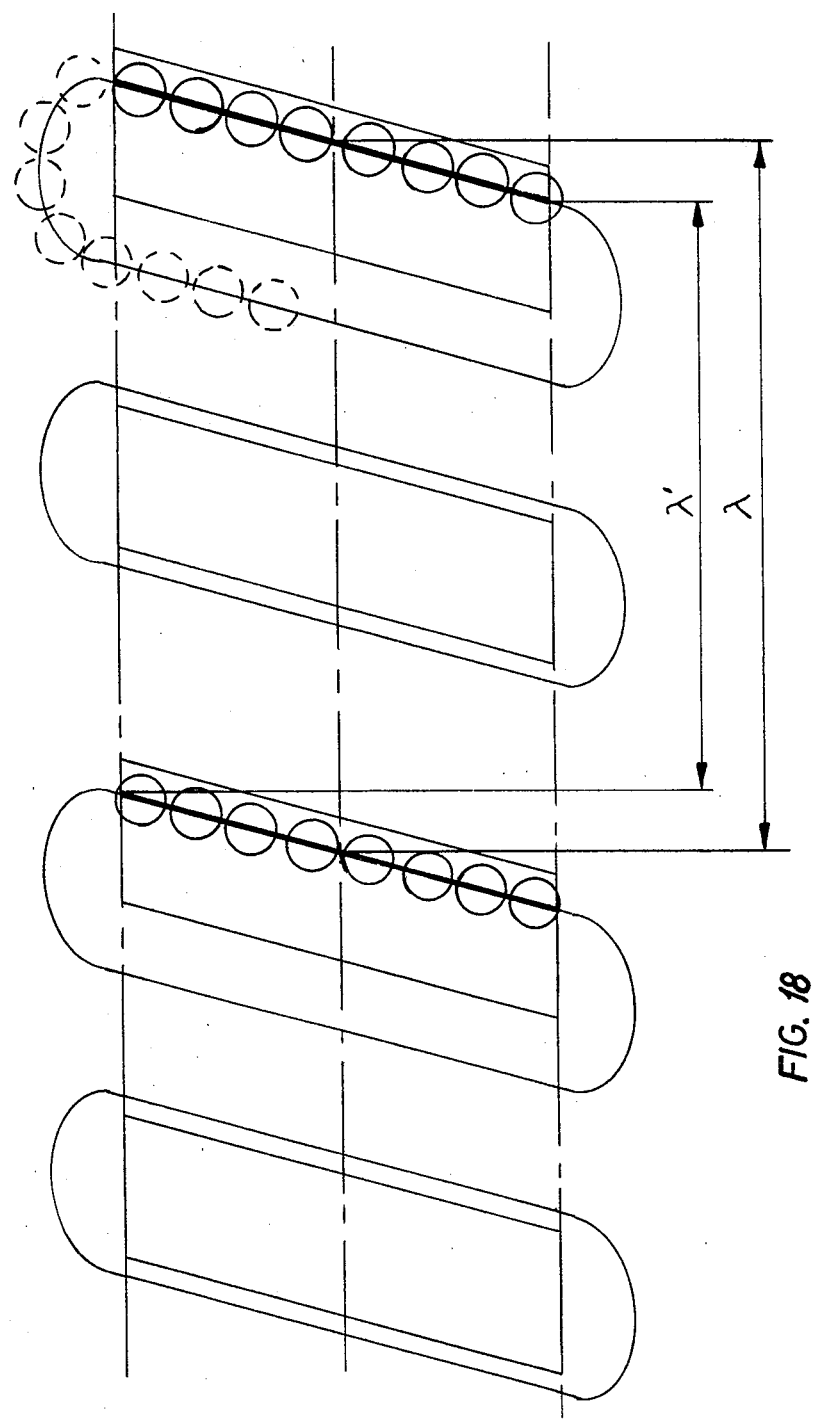

In the drawings:

FIG. 1 is a side view, partially in section, of a guide element according to the invention, FIG. 2 is a radial section of the element of FIG. 1 in an embodiment comprising three pairs (13) of ball-bearing circuits, FIGS. 3 and 4 illustrate an example relating to the value of the out-of-phase angle λ in an embodiment comprising six ball-bearing circuits, FIG. 3 illustrating the current state of the art and FIG. 4 illustrating a guide element according to the invention, FIGS. 5 and 6 illustrate an example relating to the value of the out-of-phase angle λ in an embodiment comprising eight ball-bearing circuits, FIG. 5 illustrating the current state of the art and FIG. 6 illustrating a guide element according to the invention, FIGS. 7 and 8 illustrate an example relating to the value of the out-of-phase angle λ in an embodiment comprising ten ball-bearing circuits, FIG. 7 illustrating the current state of the art and FIG. 8 illustrating a guide element according to the invention, FIG. 9 is a side view, partially in section, of a guide element according to the invention provided with terminal friction stop means made of semi-deformable plastics material, one of these means being both a stop means and sealing joint, FIG. 10 is a section of a guide element with stop means comprising a small metal ring interposed between the housing and the circular part made of a semi-deformable material, FIG. 11 illustrates a variant of FIG. 10 in which the circular part of flexible material comprises a sealing lip, FIG. 12 is a front view of the sleeve of a guide element according to the invention, provided with a longitudinal slit (24) situated at the edge of a disengagement section, FIG. 13 is a side view, partially in section, of a guide element according to the invention provided with a plurality of circular collars (25) of a deformable material, positioned in grooves (26), FIG. 14 is a front view of a guide element according to the invention provided with end stop means formed from a spring steel wire (18), FIGS. 15, 16 and 17 illustrate particular angular positions of the ball-bearings in contact in the embodiment of a guide element according to the invention with a maximum angle β at the centre of:

$$\frac{360°}{4P} - 1\epsilon,$$

the rectilinear sections of the circuits being inclined relative to the working sections by an angle φ, thus forming an angle λ' at the centre, FIG. 18 illustrates the advantage obtained with an angle λ' at the centre, compared with an angle of λ at the centre, in an embodiment of the guide element where the sectors and rectilinear sections of the circuits are inclined with respect to the axis of the guide element.

The guide element for rotary and unrestricted axial movement on a shaft as illustrated in the drawings comprises an external sleeve 1, ball-bearings 2 being arranged in closed circulation circuits 3 made in an internal tubular housing 4, the sleeve 1 having in its bore working sections 5 ensuring contact between the ball-bearings 2 and the shaft 7, and the sleeve 1 and shallow disengagement sections 6 permitting an alternating recycling of the ball-bearings 2 in the circuits 3. The circuits 3 are formed by two rectilinear longitudinal portions 8 intersecting beyond the wall of the housing. They are aligned parallel to one another and are connected at their ends by curved sections 9 situated opposite circular disengagement sections 10 made in the sleeve, which permit the passage of the ball-bearings 2 in the curved sections 9. These disengagement sections 10 are preferably in the form of a truncated cone 11 to permit a regular ascent and descent of the ball-bearings which move radially from the shaft at this point, so as to permit the existence of the section 12 in the cage in order to maintain the central part 14 of the circuits 3. These sections 12 are located at at least one end of the circuits 3. The freely rotatable ball-race 4 is restricted longitudinally with respect to the sleeve 1 by means of friction stop means 15 positioned in a circular groove 16 at the ends of the sleeve. In a different embodiment, the housing 4 may be maintained by means of ball-bearing stop means (not shown). The housing 4 is aligned radially via its internal bore 17 on the shaft 7, the bore 17 of the housing being slightly larger than the shaft 7. In order that the ball-bearings of the two rectilinear sections 8 cannot come into contact between the shaft 7 and the sleeve 1, the angle γ at the centre (see in particular FIGS. 4, 6 and 8) defined by a working sector 5 is smaller than the angle α at the centre defined by the two rectilinear sections of a circuit 3, the angle δ at the centre defined by a disengagement section 6 itself being larger than the angle α of a circuit.

The guide element according to the invention comprises a new internal geometrical arrangement consisting of a particular polar arrangement of the longitudinal rectilinear sections 8 of the closed circuits 3 for the circulation of the ball-bearings 2 relative to the set of angles at the centre formed by the working sections 5 and disengagement sections 6 in the bore of the sleeve 1. The guide element of the invention comprises a ball-race 4 provided with an even number of closed circuits 3 arranged in groups of two, these pairs of circuits 13 being equidistantly and regularly angularly distributed on the circumference of the housing, the number P of these pairs 13 being half the number H of working sections 5 or disengagement sections 6, themselves also distributed in a uniform manner in the bore of the sleeve, the angle α at the centre defined by the two rectilinear sections 8 of the same circuit being substantially equal to (360/2H)=(360/4P), the angle β at the centre defined by the two adjacent rectilinear sections 8 of each separate circuit 3 of a pair of circuits 13 being smaller and at most equal to the angle γ at the centre defined by a working section 5 of the sleeve 1. The angular relationships may therefore be written $\beta \leq \gamma < \alpha < \delta$.

In a preferred embodiment, the angle γ defined by a working section is $$\frac{360}{4P} - \epsilon,$$

ε being an angular clearance of $$\frac{360°}{4P(H+1)} \leq \epsilon \leq \frac{360°}{(H+1)^2},$$

the value of the angle β at the centre separating the two adjacent rectilinear sections in a pair of circuits being $$\frac{360°}{4P} - 2\epsilon.$$

Since the angular disposition of the working sections and disengagement sections of the sleeve is uniform, it follows that $\gamma+\delta=2$.

By virtue of the uniform angular disposition of the pairs of ball-bearing circuits 13 and by virtue of the likewise uniform disposition of the working sections 5 and disengagement sections 6 and by virtue of the aforedescribed angular values, it follows that there is an identical mutual positioning for each polar position of $360°/P$, this characteristic feature imparting a general operating symmetry and load symmetry on the guide element. Moreover, the angle $\lambda$ at the centre is defined in the guide element by: $\lambda=2\alpha+2\beta+2\epsilon=4\alpha=(360°/P)$, whereas the known systems involving alternating contact with different numbers of circuits give for example an angle $\lambda$ defined approximately by:

$360°/2.3=156°$ for a system comprising six ball-bearing circuits (see FIG. 3) compared with $360°/3=120°$ for the guide element according to the invention (see FIG. 4), i.e. a gain of 36° $360°/3.1=116°$ for a system comprising eight ball-bearing circuits (see FIG. 5), compared with $360°/4=90°$ for the guide element according to the invention (see FIG. 6), i.e. a gain of 26° $360°/3.91=92°$ for a system comprising ten ball-bearing circuits (see FIG. 7), compared with $360°/5=72°$ for the guide element according to the invention (see FIG. 8), i.e. a gain of 20°.

Conversely, the important advantages afforded by the invention with respect to the gain in the number of circulation circuits relative to a substantially identical angular value $\lambda$ may be noted.

Those skilled in the art will immediately observe that the guide element according to the invention in an example comprising eight ball-bearing circuits has an angle $\lambda$ smaller than the angle $\lambda$ of an embodiment comprising ten circuits for a known model belonging to the current state of the art, and that with two ball-bearing circuits less the guide elememnt still has a load capacity substantially greater than that of the known system, and this is even discounting the fact that by choosing the value of the angle $\beta$ to be close to the value of the angle $\gamma$, it is possible to provide for larger ball-bearings and further increase the load capacity of the guide element.

The guide element that has just been described operates like the known alternating contact guide elements belonging to the current state of the art, the circulation of the ball-bearings in the circuits serving for linear displacement and the rotation being obtained by an alternation of the rectilinear sections of ball-bearings of the circuits on the working sections of the sleeve. The invention thus consists of a reduction in the value of the angle $\lambda$ at the centre, also called the out-of-phase angle, this angle being directly related to the load capacity of the guide element and defining the latter unambiguously. By virtue of this fact, it is now possible according to the invention to manufacture an axial-rotary guide system of sufficient load capacity and low cost price, from shaft dimensions of the order of 6 millimeters to more than 50 millimeters. The number of circuits is six for guide elements of 6 to 10 millimeters, eight for guide elements of 12 to 25 millimeters, and ten for guide elements of larger dimensions. It is also possible and advantageous to provide a range of economic guide elements with six circuits for all dimensions, and in this case to use a ball-bearing diameter identical to the solely linear guide versions, for example having a shaft diameter/ball-bearing diameter ratio of 1/5 for a guide element for a shaft 12 millimeters in diameter.

The friction stop means that maintain the longitudinal arrangement of the housing 4 of the guide element according to the invention have, in one variant, a substantially polygonal spring steel wire 18.

In a second variant, the friction stop means are formed from a circular mass of semi-deformable plastics material 19, which is mounted by virtue of this elasticity in the grooves 16 situated at the ends of the sleeve. In a third variant, a small metal ring 20 is interposed between the housing 4 and the circular masses of plastics material 19, and serves to exert a frictional force against the housing. By way of variation, the small metal ring 20 is fixed to the circular masses 19 by means 21, if desired combined with vulcanisation, welding or soldering.

In a further embodiment, the circular mass 19 comprises a flexible lip 22 which imparts the characteristics of a sealing joint to the whole system, and is interchangeable with the lip-less stop means 19.

The guide element is easily assembled by "pouring" ball-bearings under gravity into the housing partially projecting from the sleeve, and a hole 23 made in the sleeve and subsequently closed by a plastics plug enables the last two ball-bearing circuits to be charged. In a variant, these latter ball-bearings are added by bending parts of the housing at a rectilinear section of each circuit, the width of this passage being made substantially less than the diameter of the ball-bearings, which are introduced by bending small sections of the housing, and this solution is particularly advantageous in the version comprising a housing made of plastics material. By way of further embodiment according to the invention, the sleeve 1 comprises a longitudinal slit 24 narrower than the diameter of the ball-bearings and situated in a disengagement section 6, preferably along the edge of the latter (FIG. 12). This slit enables the adjustment of the guide element to be regulated, for example in an adjustable support means.

In another embodiment, the guide element according to the invention comprises, on the exterior of the sleeve, parts of a compressible or elastic material serving to secure the guide element in its mounting or to position the guide element in place with a certain degree of elasticity and impart thereto a self-aligning character, and in a preferred embodiment this deformable system comprises one or more circular collars 25 of nylon or an elastomeric material, positioned in circular grooves 26 on the exterior of the sleeve 1. These collars may also serve for the axial retention of the guide element, in combination with a groove in the mounting.

By way of variation, the external diameter of the sleeve is adjustable over a short central section, this solution imparting a self-aligning character to the guide element.

By way of variation, the sleeve is in the form of a support, its exterior comprising at least one bearing surface and fixing means. The hardness of the external sleeve and ball-bearings is about 62 RC. The geometrical precision of the sleeve is important, though this may easily be achieved by grinding and polishing the working sections. These sections are advantageously obtained before the tempering of the sleeve by broaching and machining the general internal profile, and since the angles $\gamma$ and $\delta$ at the centre are large, the lateral surface separating the working sections and disengagement sections is directed radially to the centre of the guide element so that these angles do not vary during the finishing operations. Since the angles α and β at the centre are also large, the ball-bearings are positioned in the paths of the housing with a clearance of about 1/30 of their diameter. The depth of the disengagement sections is between 1/50 and 1/10 of the diameter of the ball-bearings.

The method of guidance according to the invention may, in an advantageous variation, comprise circuits whose rectilinear ball-bearing sections are inclined with respect to the axis or generatrix of the housing, the result of this feature being that during a solely linear operation, each ball-bearing has its own contact path and in the particular case where an angle ω exists between the working sections on the one hand and the rectilinear ball-bearing sections on the other hand, the entries of the ball-bearings to the sections during use involving a rotary movement take place separately, thus providing a substantially smoother operation. In this embodiment the calculations must include the angle φ at the centre defined by the angular loss due to the relative inclination ω (FIG. 15), φ being smaller than ε, and β in this case may be slightly less than or equal to γ (FIGS. 15, 16 and 17).

In an embodiment of this variation involving inclined circuits, the working sections 5 are also inclined in the same screw direction (FIG. 18), and in this case this general inclination may be much larger and may reach a value of the order of 20°. This solution reduces the effect of the out-of-phase angle λ by forming an angle λ' at the centre that is smaller than the angle λ' at the centre possible with non-inclined sections (FIG. 15), and thereby further increases the load capacity of the guide element according to the invention.

What is claimed is:

1. A guide element involving ball-bearing contact on a shaft for unrestricted linear movement and/or rotary movement, which comprises an external sleeve that axially aligns an internal tubular housing that can rotate freely and comprises closed ball-bearing circulation circuits formed by two longiduidnal sections connected to one another by curved sections at their ends, the said sleeve comprising a ball-bearing race positioning ball-bearings and having in its bore working sections that ensure contact between the said ball-bearings and said shaft and disengagement sections permitting an alternating recycling of these ball-bearings, the angular value of the working sections being smaller than the angle λ at the center defined by the two longitudinal sections of the same ball-bearing circuit and the angular value of a disengagement section being larger than the angle at the center defined by the two longitudinal sections of the circuit, wherein the said guide element is characterized in that the said ball-bearing race is provided with at least six closed ball-bearing circulation circuits arranged in groups of two, these pairs of closed circuits being distributed in a regular angular manner, the number P of pairs being half the number H of working or disengagement sections, themselves also distributed in a uniform manner in the bore of the sleeve, the angle α at the center defined by the two longitudinal sections of the same circuit being substantially equal to (360°/4P), and the angle β at the center defined by the two adjacent longitudinal sections next to one another in each individual circuit of a pair being smaller than and at most equal to the value of the angle γ at the center defined by a working section of the sleeves.

2. A guide element according to claim 1, characterized in that the angle γ at the center defined by a working section is $$\frac{360°}{4P} - \epsilon,$$

ε being an angular clearance defined by $$\frac{360°}{4P(H+1)} \leq \epsilon \leq \frac{360°}{(H+1)^2}.$$

3. A guide element according to claim 2, characterized in that the angle β at the center defined by the two adjacent longitudinal sections in a pair of circuits has the value $$\frac{360}{4P} - 2\epsilon \leq \beta \leq \frac{360}{4P} - \epsilon.$$

4. A guide element according to claim 2, characterized in that the number P of pairs of circuits is three, the ratio of the diameter of the ball-bearings to the diameter of the shaft is between 1/5 and 1/7, and the angle β at the center has the value $$\frac{360}{4P} - 2\epsilon < \beta \leq \frac{360}{4P} - \epsilon.$$

5. A guide element according to claim 1, characterized in that the out-of-phase angle λ at the center has the value $$2\left(\frac{360°}{\text{number of ball-bearing circuits}}\right).$$

6. A guide element according to claim 1, characterized in that the longitudinal sections of the ball-bearing circuits form an angle with the axis of the guide element, the angle λ at the center being smaller than $$2\left(\frac{360°}{\text{number of ball-bearing circuits}}\right).$$

7. A guide element according to claim 1, characterized in that the working sections and the longitudinal sections of the ball-bearing circuits form an angle with the axis of the guide element, the angle λ at the center being smaller by at least 10% than $$2\left(\frac{360°}{\text{number of ball-bearing circuits}}\right).$$

8. A guide element according to claim 1, characterized in that the number P of pairs of circuits is three for guide elements operating on a shaft of diameter smaller than 12 millimeters, is four for guide elements where the shaft diameter is between 12 and 25 millimeters, and is five for guide elements where the shaft diameter is greater than 25 millimeters.

9. A guide element according to claim 1, characterized in that the ball-race is positioned axially relative to the sleeve by means of friction stop means consisting of a polygonal-shaped spring steel wire.

10. A guide element according to claim 1, characterized in that the ball-race is positioned axially relative to the sleeve by means of collars of a semideformable plastics material mounted in circular grooves located at the ends of the sleeve.

11. A guide element according to claims 1 or 10, characterized in that circular retention masses of semi-deformable material are provided and a small metal ring is situated between the ball-race and said circular retention masses of semi-deformable material.

12. A guide element according to claim 11, characterized in that means are provided to secure the said small metal ring relative to the said circular retention masses of semi-deformable material.

13. A guide element according to claim 12, characterized in that the said circular mass of semi-deformable material comprises a flexible circular lip in contact with the said shaft and serving as a sealing joint.

14. A guide element according to claim 1, characterized in that the sleeve comprises parts of deformable material and at least one circular collar of flexible material, situated in circular mountings on its exterior, the depth of the mounting being less than the cross-sectional height of the collar.

15. A guide element according to claim 1, characterized in that the sleeve comprises a longitudinal slit narrower than the diameter of a ball-bearing and communicating beyond the sleeve with one of said disengagement sections, the said slit being situated on the edge of the adjacent working section.

* * * * *